United States Patent
Vageline et al.

(10) Patent No.: US 7,577,804 B2
(45) Date of Patent: Aug. 18, 2009

(54) DETECTING DATA INTEGRITY

(75) Inventors: Michael P. Vageline, Tucson, AZ (US); Michael John Jones, Chandlers Ford (GB); Richard B. Stelmach, Tucson, AZ (US); Yu-Cheng Hsu, Tucson, AZ (US); Richard Anthony Ripberger, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 507 days.

(21) Appl. No.: 10/960,393

(22) Filed: Oct. 6, 2004

(65) Prior Publication Data

US 2006/0075287 A1    Apr. 6, 2006

(51) Int. Cl.
*G06F 12/00* (2006.01)
*G06F 13/00* (2006.01)
*G06F 13/28* (2006.01)
*G06F 11/00* (2006.01)

(52) U.S. Cl. .......................................... 711/159; 714/6
(58) Field of Classification Search ................. 711/114, 711/162, 159; 714/6
See application file for complete search history.

(56) References Cited

U.S. PATENT DOCUMENTS

| | | | |
|---|---|---|---|
| 4,156,798 A | 5/1979 | Doelz | |
| 5,758,054 A * | 5/1998 | Katz et al. | 714/22 |
| 5,774,643 A | 6/1998 | Lubbers et al. | |
| 5,835,953 A * | 11/1998 | Ohran | 711/162 |
| 5,889,934 A * | 3/1999 | Peterson | 714/6 |
| 6,530,043 B1 | 3/2003 | Beardsley et al. | |
| 6,553,511 B1 * | 4/2003 | DeKoning et al. | 714/6 |
| 6,557,088 B2 | 4/2003 | Tamura | |
| 6,799,284 B1 * | 9/2004 | Patel et al. | 714/6 |
| 2002/0029326 A1 | 3/2002 | Reuter et al. | |
| 2002/0046330 A1 | 4/2002 | Suzuki et al. | |
| 2002/0091903 A1 * | 7/2002 | Mizuno | 711/154 |
| 2002/0112134 A1 * | 8/2002 | Ohran et al. | 711/162 |
| 2003/0188035 A1 | 10/2003 | Lubbers et al. | |

* cited by examiner

*Primary Examiner*—Sheng-Jen Tsai
(74) *Attorney, Agent, or Firm*—Rabindranath Dutta; Konrath Raynes & Victor LLP

(57) ABSTRACT

Provided are a method, system, and article of manufacture for detecting data integrity. An indicator is written to invalidate a data block that is capable of being stored in a plurality of sectors of a storage device, wherein the indicator is written to the storage device in at least one sector that is not included in the plurality of sectors. A writing of entire contents of the data block to the plurality of sectors of the storage device is initiated, in response to the writing of the indicator. The indicator is updated to validate the data block, in response to a completion of the writing of the entire contents of the data block to the plurality of sectors of the storage device.

33 Claims, 8 Drawing Sheets

DETECTING DATA INTEGRITY

BACKGROUND

1. Field

The disclosure relates to a method, system, and article of manufacture for detecting data integrity.

2. Background

A computational device, such as, a storage controller, may write and store data in one or more storage devices. When data is stored in a storage device, data integrity refers to the validity of stored data. Data integrity may be compromised in a number of ways. Errors may occur when data is transmitted from the computational device to the storage device. Hardware malfunctions, such as, disk crashes may invalidate the data. Natural disasters, such as, fires and floods or power outages may also invalidate the data. Threats to data integrity may be reduced by backing up data regularly, by controlling access to data via security mechanisms, by applying error detection and correction mechanisms, etc. For example, Redundant Array of Independent Disks (RAID) is a mechanism for ensuring data integrity by making disks fault tolerant for disaster recovery in a disk storage system. In RAID level 5, the parity corresponding to data on a plurality of disks may be computed and the parity may be used to recover from a disk failure without losing any data.

One of the ways in which data integrity can be lost occurs when data being written to one or more storage devices is interrupted during the transfer of data to the one or more storage devices. For example, a power failure may occur during the process of data transfer and cause data integrity to be lost. In particular, if the partially transferred data is treated as a valid data then a problem of data integrity may arise.

In many situations, in which a computational device, such as, a storage controller, writes data to one or more storage devices, the data written may span a plurality of sectors, where a sector is a unit of data storage. For example, in certain situations the data written to a computational device may be over 10 Kilobytes in size. In such a situation, if there is a power failure or some other error during the process of writing data, then data integrity of the data stored in the one or more storage devices may be lost.

SUMMARY OF THE DESCRIBED EMBODIMENTS

Provided are a method, system, and article of manufacture for detecting data integrity. An indicator is written to invalidate a data block that is capable of being stored in a plurality of sectors of a storage device, wherein the indicator is written to the storage device in at least one sector that is not included in the plurality of sectors. A writing of entire contents of the data block to the plurality of sectors of the storage device is initiated, in response to the writing of the indicator. The indicator is updated to validate the data block, in response to a completion of the writing of the entire contents of the data block to the plurality of sectors of the storage device.

In additional embodiments, the indicator is a first indicator that is capable of validating the data block if at least one version of the entire contents of the data block has been completely written to the storage device. A second indicator is written to the at least one sector, wherein the second indicator indicates a version number of the data block. In further embodiments, the first indicator is read and the second indicator is written to the at least one sector. A determination is made that the data block is valid and has the version number indicated in the second indicator, in response to determining that the first indicator has validated the data block. In yet further embodiments, the at least one sector and the plurality of sectors comprise a record, wherein the at least one sector is a first sector of the record, wherein the at least one sector comprises a record header, wherein the first indicator is a checkfield indicator comprising an error detection code, and wherein the second indicator is a generation count indicator.

In yet additional embodiments, an interruption is received subsequent to the initiating of the writing of the entire contents of the data block and prior to the updating of the indicator to validate the data block. The indicator is read to determine whether the data block is invalid.

In further embodiments, the indicator indicates a version number of the data block. A new version number of the data block is written with the entire contents of the data block in the plurality of sectors of the data block, wherein the updating of the indicator to validate the data block further comprises writing the new version number of the data block to the indicator.

In still further embodiments, version numbers corresponding to the data block and the indicator are read. A determination is made that the data block is valid if the version numbers corresponding to the data block and the indicator are the same.

In additional embodiments, version numbers corresponding to the data block and the indicator are read. A determination is made that the data block is invalid if the version numbers corresponding to the data block and the indicator are different.

In yet additional embodiments, a plurality of versions and associated version numbers of a plurality of data blocks are stored in a plurality of storage devices. A comparison is made of the version numbers of the plurality of data blocks to determine one data block with most recently updated data. In certain additional embodiments, the plurality of storage devices are RAID arrays, wherein the writing, the initiating, the updating, the storing, and the comparing are performed by a storage controller that is coupled to the RAID arrays by a plurality of device adapters.

In certain additional embodiments, the writing, the initiating, and the updating are performed by a data integrity controller implemented in a computational device coupled to the storage device.

In yet additional embodiments, the writing, the initiating, and the updating are performed by a data integrity controller implemented in the storage device.

In further embodiments, the entire contents of the data block comprise data corresponding to the data block, wherein the data is generated by a computational device for storing in the storage device, and wherein the entire contents do not include the indicator.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

When writing a data block than spans a plurality of sectors, in certain embodiments an indication may have to be provided to one or more applications or controllers in a computational device as to whether the entire data in the data block completed the write. In certain embodiments, a write request may be issued to a device adapter where the device adapter or a disk drive divides the data block into a plurality of parallel out of order writes for enhancing performance. If the device adapter or the disk drive powers off suddenly or a write operation is inadvertently dropped, it may not be possible to determine with certainty which writes were completed and which writes did not complete. If the data block is read after power is restored, the results may be indeterminate since some writes may have completed and some writes may not have completed, causing a data integrity problem with the data block.

Figure 1:
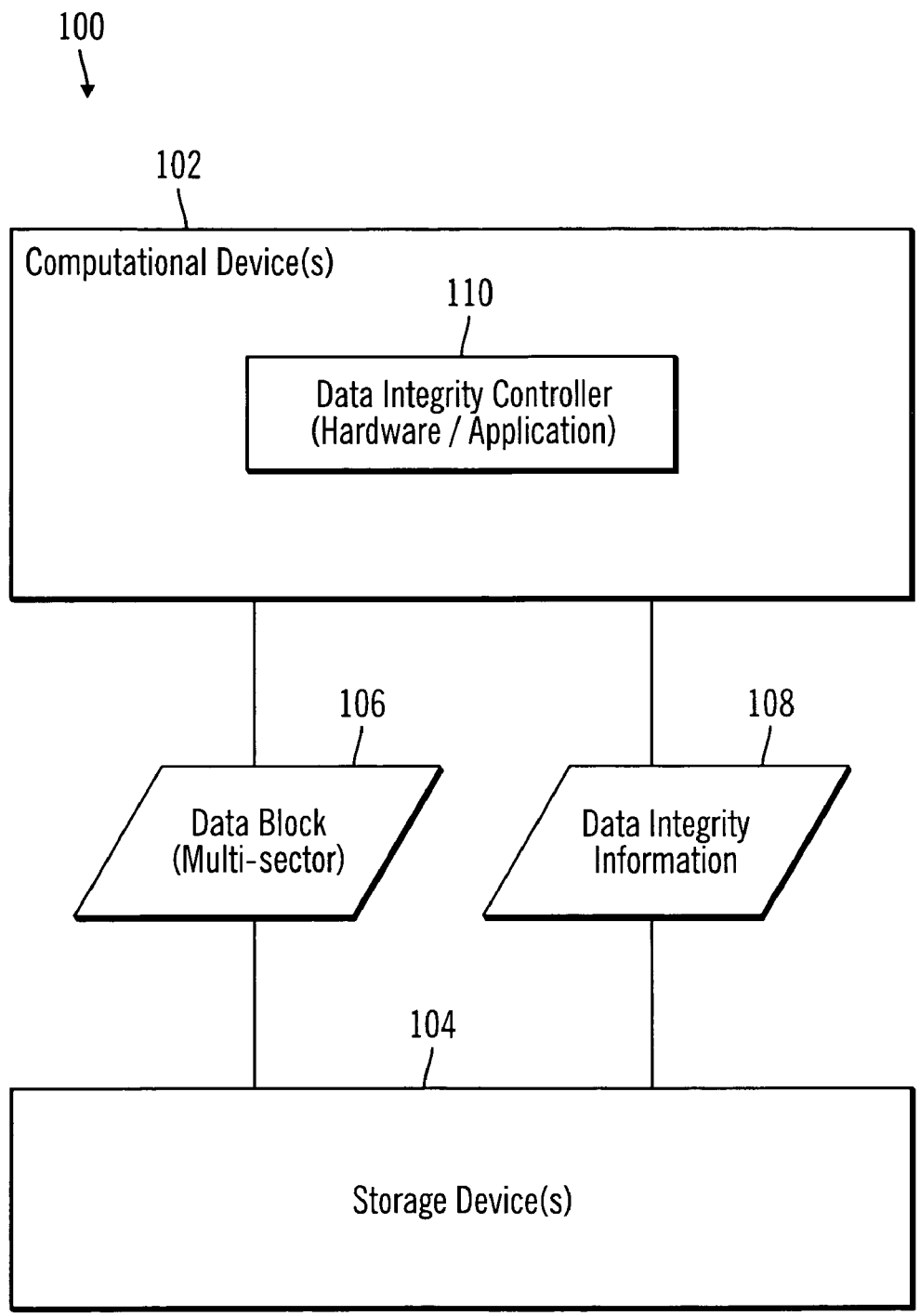
FIG. 1 illustrates a block diagram of a first computing environment in accordance with certain embodiments.

FIG. 1 illustrates a block diagram of a first computing environment 100 in accordance with certain embodiments.

A computational device 102 is coupled to one or more storage devices 104. In certain embodiments, the computational device 102 may comprise any type of computational device, such as, a workstation, a storage controller, a storage system controller, a storage subsystem controller, a desktop computer, a laptop, a mainframe, a telephony device, a hand held computer, etc. The storage device 104 may comprise a disk based storage device, a tape based storage device, or any other storage device that is capable of storing data.

In certain embodiments, the computational device 102 generates a data block 106 for storage in the storage device 104. In certain embodiments, the data block 106 when written on the storage device 104 may span a plurality of sectors, i.e., the data block 106 may comprise a multi-sector data block. In certain embodiments, the size of the data block 106 may exceed a kilobyte.

If data transfer from the computational device 102 to the storage device 104 is interrupted while the data block 106 is being written to the storage device 104, then the partial data that is written into the storage device 104 may cause a situation where the partially written data may lack data integrity.

In certain embodiments, the data block 106 is split into a plurality of smaller data blocks by one or more device adapters or bridges that are included in or coupled to the computational device 102. The smaller data blocks may be sent in parallel to the storage device 104 from the computation device 102. In case of an interruption of the transfer of data from the computational device 102 to the storage device 104 some of the smaller data blocks may not be written into the storage device 104, causing a lack of data integrity in the data stored in the storage device 104.

In certain embodiments, in addition to sending the multi-sector data block 106, the computational device 102 also sends data integrity information 108 to the storage device 104. In certain embodiments, the data integrity information 108 is stored in an additional sector that is not part of the sectors of the multi-sector data block 106. Additionally, in certain embodiments, the data integrity information 108 is not only stored in an additional sector that is not part of the sectors of the multi-sector data block 106 but is also stored in the multi-sector data block 106.

In certain embodiments, the computational device 102 includes one or more data integrity controllers 110, where the one or more data integrity controllers 110 control the generation of the multi-sector data block 106 and the data integrity information 108, such that, data integrity is preserved in the storage device 104. The data integrity controller 110 may be implemented in hardware, software, firmware or any combination thereof. For example, the data integrity controller 110 may be implemented in hardware as a controller for storage devices or may be implemented as an application.

While FIG. 1 shows the data integrity controller 110 in the computation device 100, in certain alternative embodiments, the data integrity controller 110 may be implemented in the storage device 104 for maintaining data integrity in the storage device 104.

FIG. 1 illustrates an embodiment in which the data integrity controller 110 maintains data integrity in the storage device 104 by coupling data integrity information 108 with a multi-sector data block 106, where the data integrity information 108 and the multi-sector data block 106 are written to the storage device 104.

Figure 2:
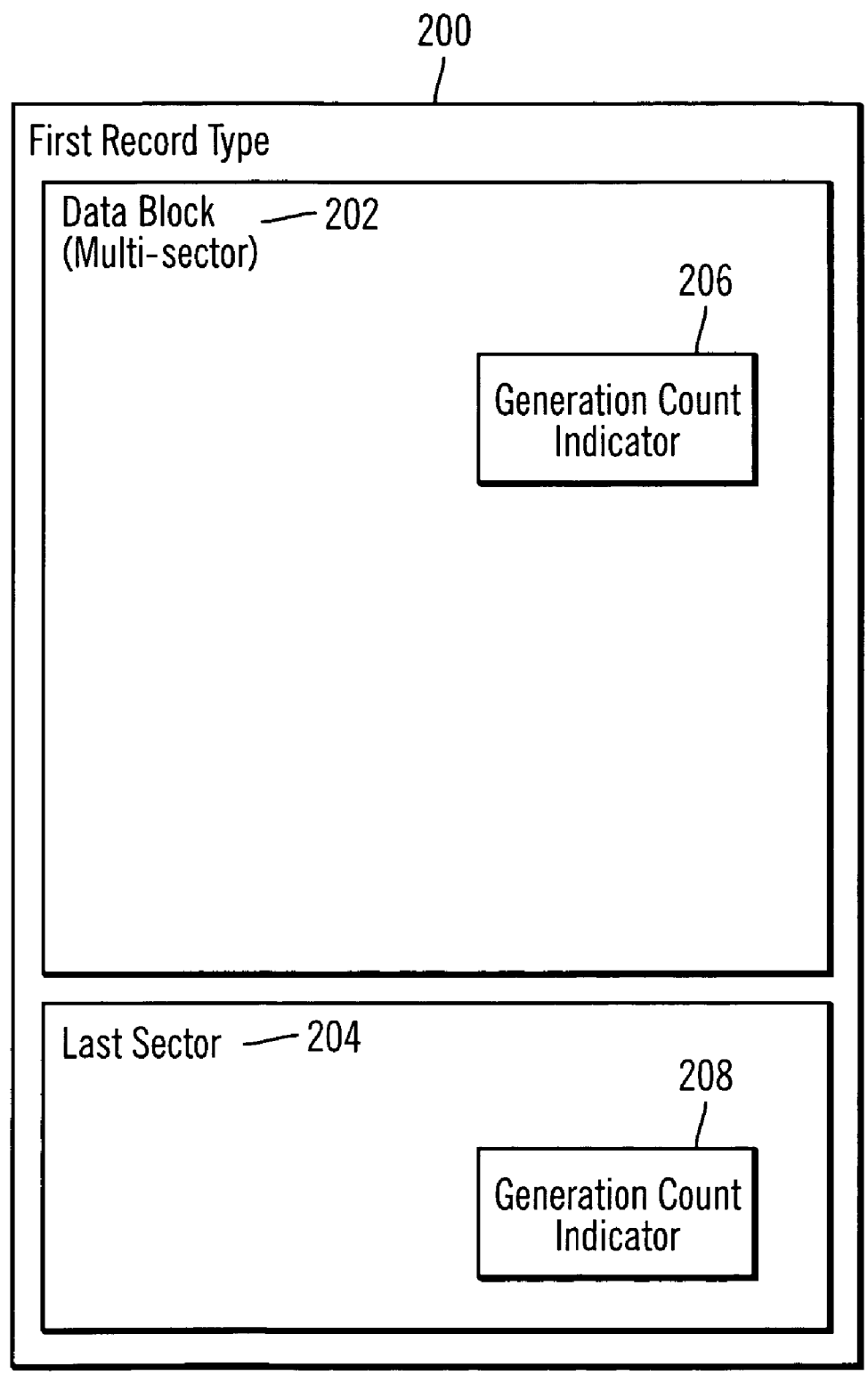
FIG. 2 illustrates a block diagram of a record of a first record type comprising a data block and a last sector, in accordance with certain embodiments corresponding to the first computing environment.

FIG. 2 illustrates a block diagram of a record of a first record type 200, in accordance with certain embodiments corresponding to the first computing environment 100. The data structures corresponding to the first record type 200 may be implemented by the data integrity controller 110 and may correspond to the organization of data in the storage device 104.

A record of the first record type 200 may comprise a plurality of sectors, comprising a multi-sector data block 202 and a last sector 204. In certain embodiments, the multi-sector data block 202 and the last sector 204 together corresponds to the data block 106 and the data integrity information 108 illustrated in the computing environment 100 of FIG. 1.

In certain embodiments the multi-sector data block 202 includes a generation count indicator 206 and the last sector includes a generation count indicator 208, where the generation count indicators 206, 208 are used by the data integrity controller 110 to maintain data integrity in the storage device 104. In certain embodiments, the generation count indicators 206, 208 may indicate a version of the data in the multi-sector data block 202 or the absence of a valid version of the data in the multi-sector data block 202. The version of the data may be indicated via a version number.

Figure 3A:
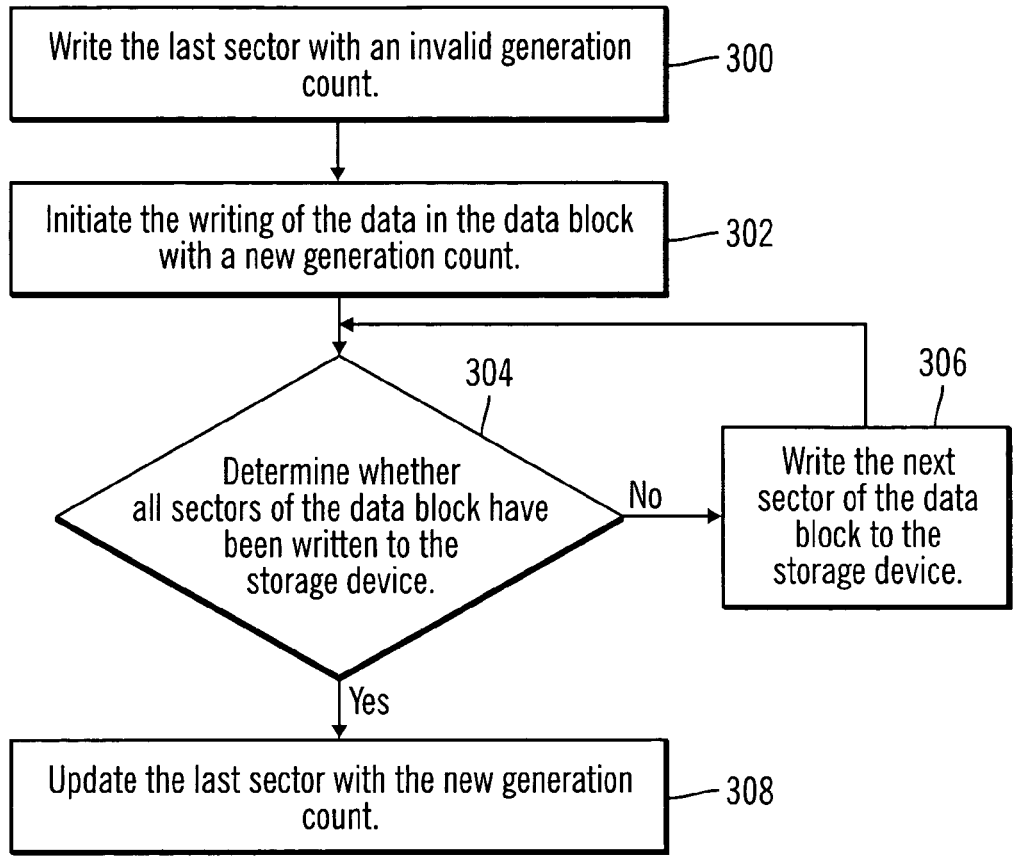
FIG. 3*a* illustrates operations for ensuring data integrity by using the record of the first record type, in accordance with certain embodiments corresponding to the first computing environment.

FIG. 3a illustrates operations for ensuring data integrity by using records of the first record type 200, in accordance with certain embodiments corresponding to the first computing environment 100. The operations may be implemented by the data integrity controller 110.

Control starts at block 300, where the data integrity controller 110 writes the last sector 204 with an invalid generation count in the generation count indicator 208. Writing an invalid generation count may imply that the data written to the storage device 104 is not valid. For example, in certain embodiments the data transfer from the computational device 102 to the storage device 104 has yet to be completed during the execution of the operation of block 300.

The data integrity controller 110 initiates (at block 302) the writing of the data in the multi-sector data block 202 with a new generation count. In certain embodiments, the new generation count may indicate the version of the multi-sector data block 202.

The data integrity controller 110 determines (at block 304) whether all sectors of the multi-sector data block 202 have been written to the storage device 104. If not, then the data integrity controller writes (at block 306) the next sector of the multi-sector data block 202 to the storage device 104 and again determines (at block 304) whether all sectors of the multi-sector data block 202 have been written to the storage device 104.

If at block 304, the data integrity controller 110 determines that all sectors of the multi-sector data block 202 have been written to the storage device 104 then the data integrity controller 110 updates (at block 308) the last sector 204 with the new generation count in the generation count indicator 208. The multi-sector data block 202 and the last sector 204 indicates the same generation count at the conclusion of block 308.

If there is an interruption of data transfer during the execution of operations described in blocks 300-306 and before the conclusion of the operation described in block 308, then the multi-sector data block 202 and the last sector 204 will not indicate the same generation count at the conclusion of the execution of the operation of block 308. For example, if there is a power failure during the execution of the operation of block 306, then the multi-sector data block 202 will have a new generation count and the last sector 204 will have an invalid generation count.

Figure 3B:
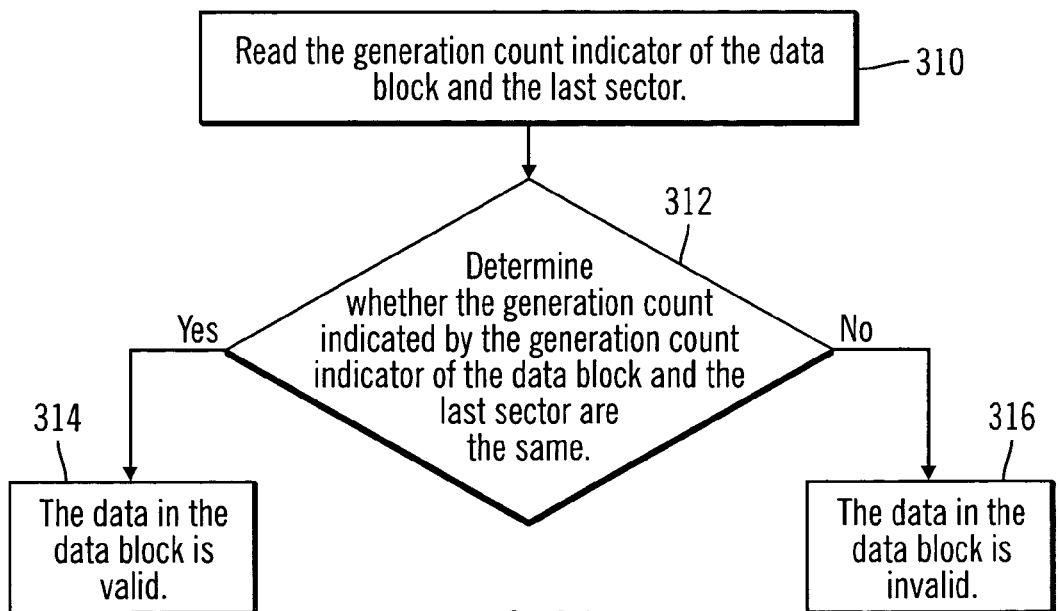
FIG. 3b illustrates operations for determining whether data written to a record of the first record type is valid, in accordance with certain embodiments corresponding to the first computing environment.

FIG. 3b illustrates operations for determining whether data written to a record of the first record type 200 is valid, in accordance with certain embodiments corresponding to the first computing environment 100. The operations may be implemented by the data integrity controller 110. In certain embodiments, the operations described in FIG. 3b may be performed after performing one or more operations described in FIG. 3a.

Control starts at block 310, where the data integrity controller 110 reads the generation count indicator 206 of the multi-sector data block 202 and the generation count indicator 208 of the last sector 204.

The data integrity controller 10 determines (at block 312) whether the generation count indicated by the generation count indicator 206 of the multi-sector data block 202 and the generation count indicator 208 of the last sector 204 are the same. If so, then the data integrity controller 110 determines (at block 314) that the data in the multi-sector data block 202 is valid. If not, then the data integrity controller 110 determines (at block 316) that the data in the multi-sector data block 202 is invalid.

The operations illustrated in FIGS. 3a and 3b describe certain embodiments in which the data integrity controller 110 writes generation counts in a multi-sector data block 202 and a last sector 204 associated with the multi-sector data block 202. The generation count in the last sector 204 is updated after the entire multi-sector data block 202 has been written to the storage device 104. If the writing of the entire multi-sector data block 202 is interrupted, such that, the entire multi-sector data block 202 is not written to the storage device 104, then the generation counts of the multi-sector data block 202 and the last sector 204 are different and the data integrity controller 110 determines that the data in the multi-sector data block 202 is invalid.

Figure 4:
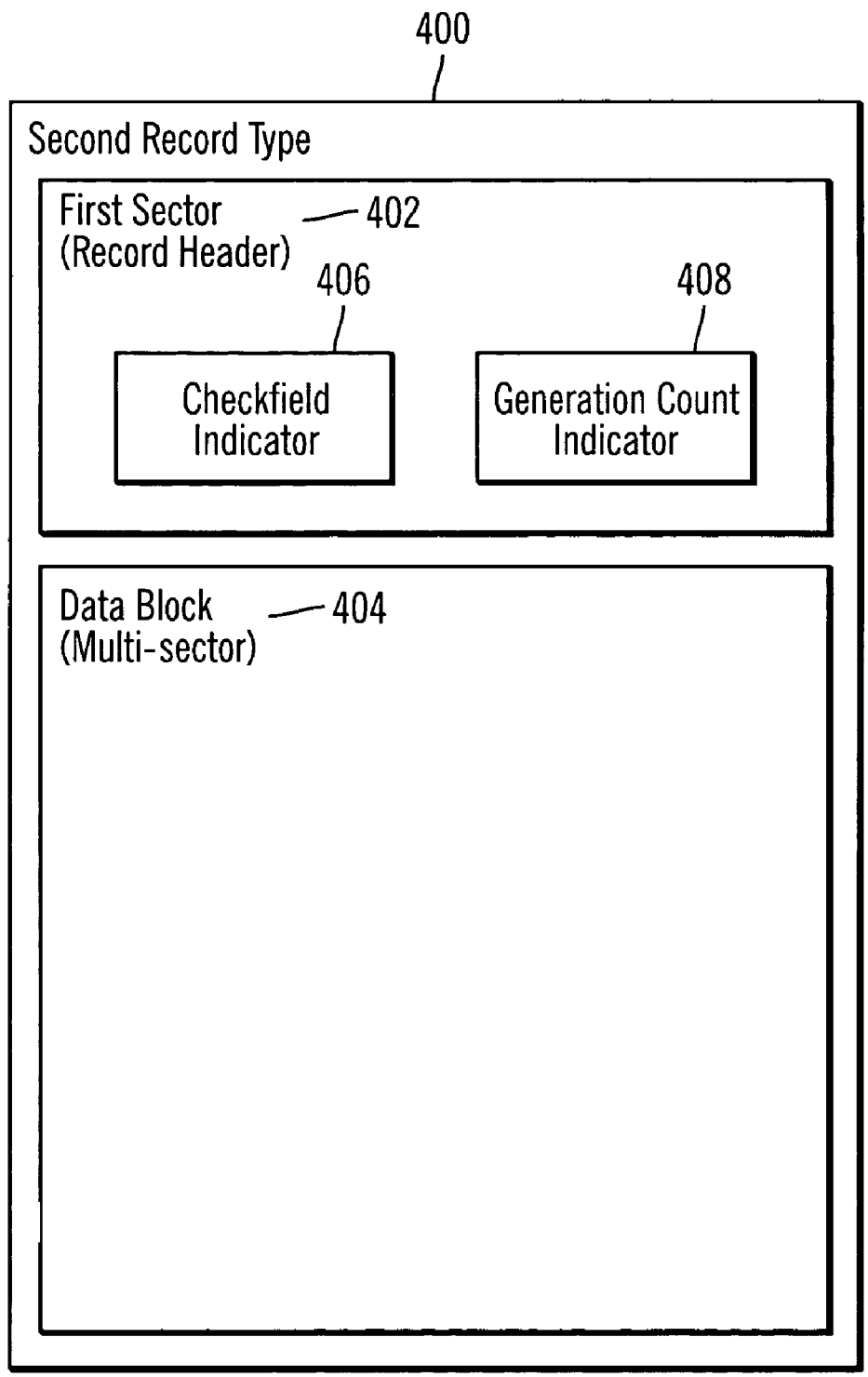
FIG. 4 illustrates a block diagram of a record of a second record type comprising a first sector and a data block, in accordance with certain embodiments corresponding to the first computing environment.

FIG. 4 illustrates a block diagram of a record of a second record type 400, in accordance with certain embodiments corresponding to the first computing environment 100. The data structures corresponding to the second record type 400 may be implemented by the data integrity controller 110 and may correspond to the organization of data in the storage device 104.

The record of the second record type 400 may comprise a plurality of sectors, comprising a first sector 402 and a multi-sector data block 404. In certain embodiments, the multi-sector data block 404 and the first sector 402 together corresponds to the data block 106 and the data integrity information 108 illustrated in the computing environment 100 of FIG. 1. In certain embodiments the first sector 402 may comprise a record header of a record of the second record type 400.

In certain embodiments the first sector 402 includes a checkfield indicator 406 and a generation count indicator 408. The checkfield indicator 406 and the generation count indicator 408 are used by the data integrity controller 110 to maintain data integrity in the storage device 104. In certain embodiments, the generation count indicator 408 may indicate a version of the data in the multi-sector data block 404, and the checkfield indicator 406 may indicate whether the multi-sector data block 404 has been completely written to the storage device 104. In certain embodiments, the checkfield indicator 406 may store a value that corresponds to a cyclic redundancy check (CRC) or a longitudinal redundancy check (LRC) of a corresponding multi-sector data block. Other error detection codes besides CRC or LRC may also be used. In an exemplary embodiment, if the checkfield indicator 406 is expected to store a CRC corresponding to a multi-sector data block, then the value stored in the checkfield indicator 406 may be compared to the CRC calculated from the data stored in the multi-sector data block to determine whether the multi-sector data block includes valid data.

Figure 5A:
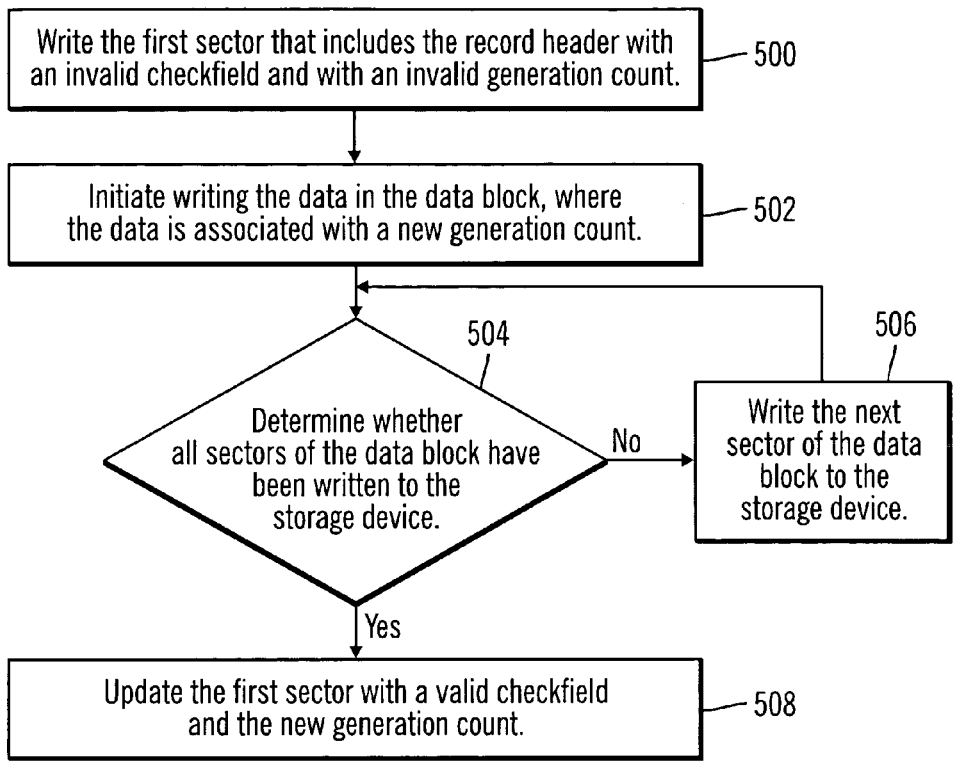
FIG. 5a illustrates operations for ensuring data integrity by using the record of the second record type, in accordance with certain embodiments corresponding to the first computing environment.

FIG. 5a illustrates operations for ensuring data integrity by using a record corresponding to the second record type 400, in accordance with certain embodiments corresponding to the first computing environment 100. In certain embodiments, the operations may be implemented by the data integrity controller 110.

Control starts at block 500, where the data integrity controller 110 writes the first sector 402 with an invalid checkfield to the checkfield indicator 406 and an invalid generation count to the generation count indicator 408. An invalid checkfield in the checkfield indicator 406 may imply that the complete multi-sector data block 404 has not been written to the storage device 104. For example, in certain embodiments the data transfer from the computational device 102 to the storage device 104 has yet to be completed during the execution of the operation of block 500.

The data integrity controller 110 initiates (at block 502) the writing of the data in the data block 404, where the data is associated with a new generation count that indicates the version of the data being written to the data block 404.

The data integrity controller 110 determines (at block 504) whether all sectors of the data block 404 have been written to the storage device 104. If not, then the data integrity controller 110 writes (at block 506) the next sector of the data block 404 to the storage device 104 and again determines (at block 504) whether all sectors of the data block 404 have been written to the storage device 104.

If at block 504, the data integrity controller 110 determines that all sectors of the data block 404 have been written to the storage device 104 then the data integrity controller 110 updates (at block 508) the first sector 402 with a valid checkfield in the checkfield indicator 406 and the new generation count in the generation count indicator 408. At the conclusion of block 508, the first sector 402 indicates a valid checkfield and the new generation count of the completely written multi-sector data block 404.

If there is an interruption of data transfer during the execution of operations described in blocks 500-506 and before the conclusion of the operation described in block 508, then the first sector 402 will not indicate a valid checkfield. For example, if there is a power failure during the execution of block 506, then the first sector 402 will indicate an invalid checkfield.

Figure 5B:
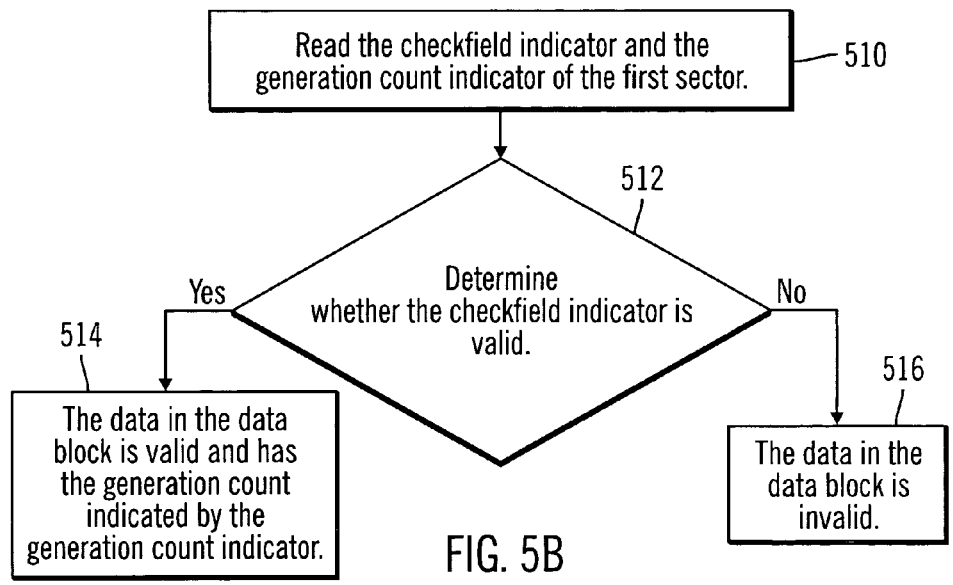
FIG. 5b illustrates operations for determining whether data written to the record of the second record type is valid, in accordance with certain embodiments corresponding to the first computing environment.

FIG. 5b illustrates operations for determining whether data written to a record of the second record type 400 is valid, in accordance with certain embodiments corresponding to the first computing environment 100. The operations may be implemented by the data integrity controller 110. In certain embodiments, the operations described in FIG. 5b may be performed after performing one or more operations described in FIG. 5a.

Control starts at block 510, where the data integrity controller 110 reads the checkfield indicator 406 and the generation count indicator 408 of the first sector 402. In certain embodiments, the data integrity controller 110 may need to read the entire data block 404 in order to calculate a valid checkfield. For example, if the checkfield denotes a CRC or a LRC, the data integrity controller 110 may need to read the entire data block 404 in order to calculate the valid checkfield.

The data integrity controller 110 determines (at block 512) whether the checkfield indicator 406 indicates a valid checkfield. If so, then the data integrity controller 110 determines (at block 514) that the data in the multi-sector data block 404 is valid and has the generation count indicated by the generation count indicator 408. If not, then the data integrity controller 110 determines (at block 516) that the data in the multi-sector data block 404 is invalid.

The operations illustrated in FIGS. 5a and 5b describe certain embodiments in which the data integrity controller 110 writes a checkfield indicator 406 in a first sector 402 associated with a multi-sector data block 404. The checkfield indicator 406 is invalidated before starting to write the multi-sector data block 404. After the multi-sector data block 404 has been completely written to the storage device 104 a valid checkfield is written to the checkfield indicator 406. If the writing of the entire multi-sector data block 404 is interrupted, such that, the entire multi-sector data block 404 is not written to the storage device 104, then the checkfield indicator 406 indicates that the data block 404 is invalid. In alternative embodiments, any other sector that is different from the first sector 402 may be used to record the checkfield indicator 406 and the generation count indicator 408. For example, the data integrity controller 110 may write the checkfield indicator 406 and the generation count indicator 408 to the last sector of records of the second record type 400 written to the storage device 104. In certain embodiments, a single read operation performed by reading the checkfield indicator 406 can verify whether the data block 404 written to the storage device 104 is valid.

Figure 6:
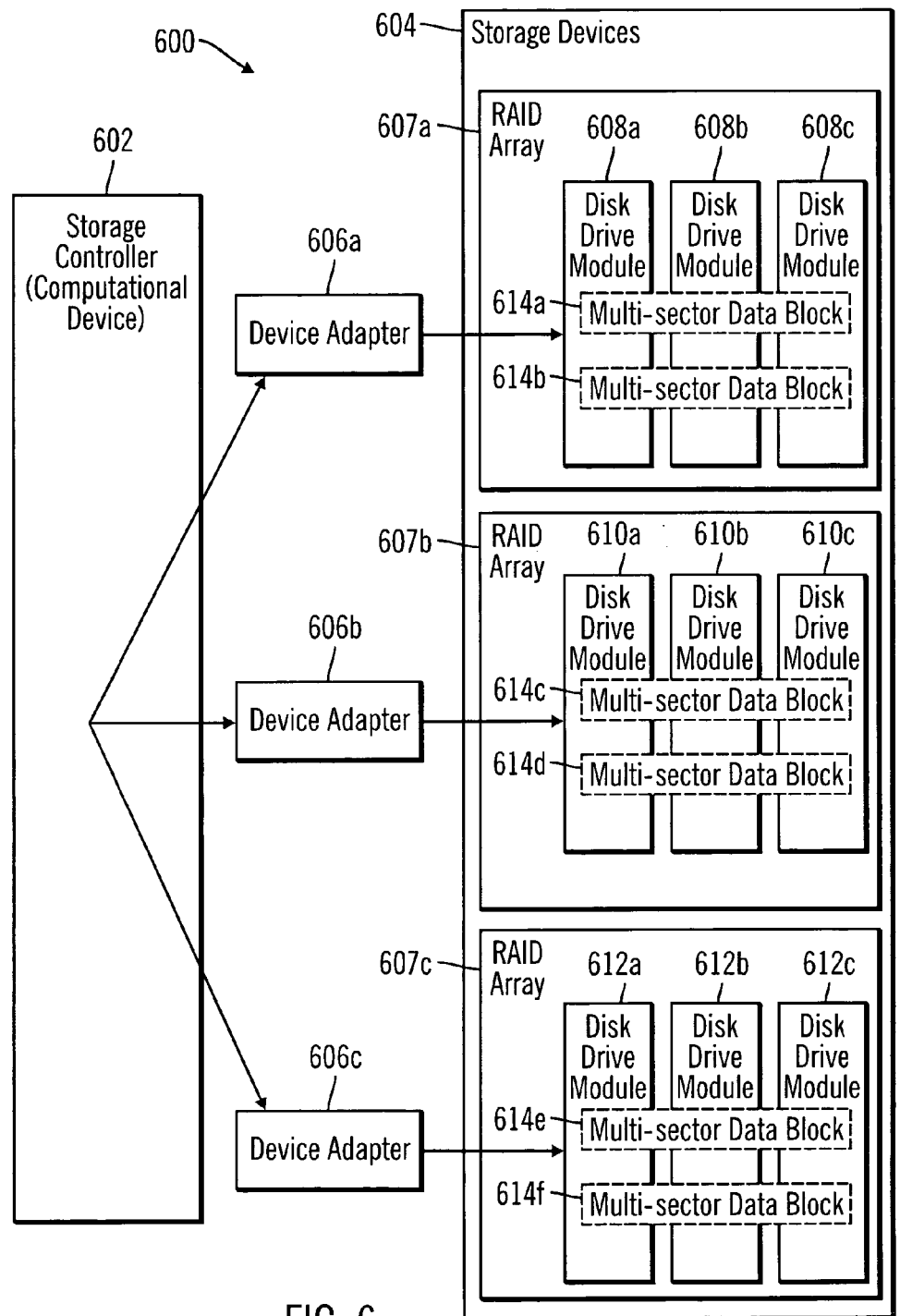
FIG. 6 illustrates a block diagram of a second computing environment for ensuring data integrity, in accordance with certain embodiments.

FIG. 6 illustrates a block diagram of a second computing environment 600 for ensuring data integrity, in accordance with certain embodiments.

In certain exemplary embodiments, a storage controller 602 is coupled to storage devices 604 via a plurality of device adapters 606a, 606b, 606c. While FIG. 6 illustrates three device adapters, in alternative embodiments a greater or a fewer number of device adapters may be present.

The storage devices 604 comprise a plurality of RAID arrays 607a, 607b, 607c, where each RAID array comprises a plurality of disk drive modules. For example, RAID array 607a comprises the disk drive modules 608a, 608b, 608c, RAID array 607b comprises the disk drive modules 610a, 610b, 610c, and RAID array 607c comprises the disk drive modules 612a, 612b, 612c, where each device adapter 606a, 606b, 606c is coupled to at least one RAID array. In alternative embodiments, there may be a greater or a fewer number of RAID arrays and the device adapters 606a, 606b, 606c may be coupled differently to the RAID arrays 607a, 607b, 607c.

The storage controller 602 stores different versions of multi-sector data blocks 614a, 614b, 614c, 614d, 614e, 614f via the device adapter 606a, 606b, 606c in the RAID arrays 607a, 607b, 607c. Note that a single multi-sector data block is not written across a plurality of RAID arrays. In alternative embodiments a greater or a fewer number of multi-sector data blocks may be present. In certain embodiments, the storage controller 602 may implement the computational device 102 illustrated in FIG. 1, and the storage devices 604 may implement the storage devices 104 illustrated in FIG. 1.

Figure 7A:
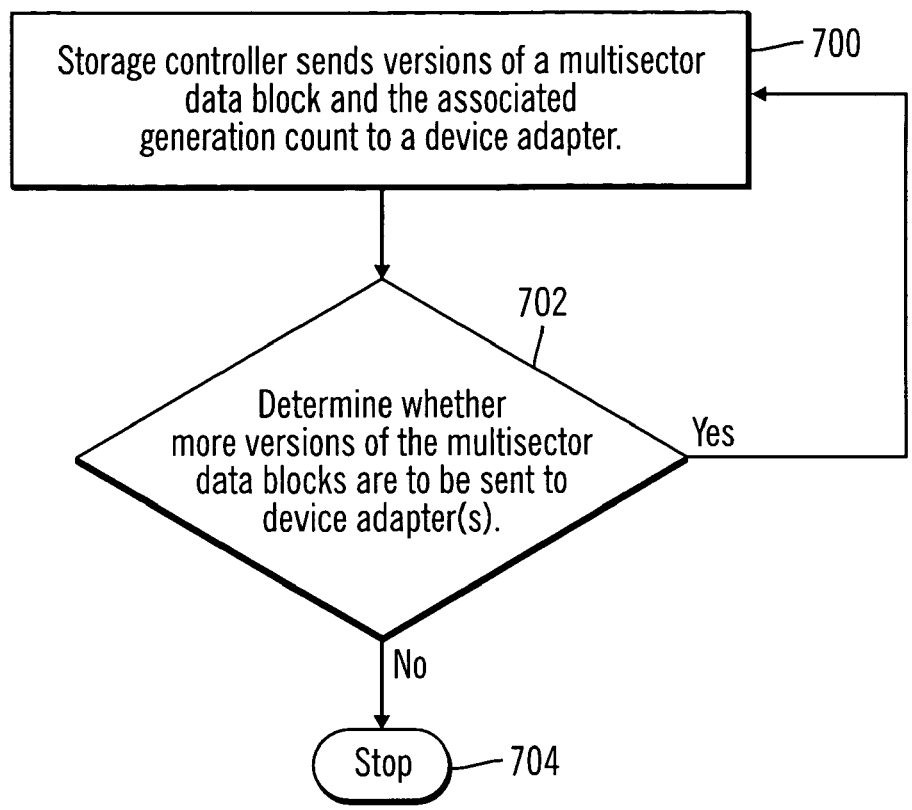
FIG. 7a illustrates operations for storing a plurality of versions of multi-sector data blocks in exemplary RAID arrays in the second computing environment, in accordance with certain embodiments.

FIG. 7a illustrates operations for storing a plurality of versions of multi-sector data blocks in the second computing environment 600, in accordance with certain embodiments. The operation illustrated in FIG. 7a may be implemented in the storage controller 602.

Control starts at block 700 where the storage controller 602 sends one or more multi-sector data blocks 614a . . . 614f to the storage devices 604 via the device adapter 606a . . . 606c. Along with a multi-sector data block the storage controller 602 also sends the associated generation count. The multi-sector data blocks 614a . . . 614f may comprise different versions of the same data and may have different associated generation counts.

The storage controller determines (at block 702) whether more versions of the multi-sector data blocks 614a . . . 614f are to be sent to the storage devices 604 via the device adapters 606a . . . 606c. If so, additional versions of the multi-sector data blocks 614a . . . 614f are sent (at block 700) to the storage devices 604 from the storage controller 602 via the device adapters 606a . . . 606c. If not, the process stops (at block 704).

FIG. 7a illustrates embodiments in which versions of the multi-sector data blocks 614a . . . 614f are stored in RAID arrays with associated generations counts. In certain embodiments, the multi-sector data blocks 614a . . . 614f may be read by the storage controller 602 and the latest version of the multi-sector data blocks 614a . . . 614f may be determined from the associated generation counts.

Figure 7B:
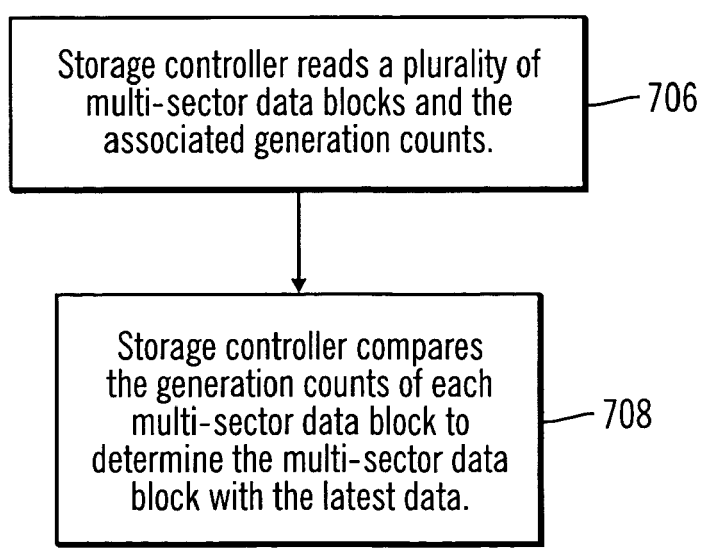
FIG. 7b illustrates operations for determining the latest version of the plurality of versions of multi-sectors data blocks in exemplary RAID arrays in the second computing environment, in accordance with certain embodiments.

FIG. 7b illustrates operations for determining the latest version of the plurality of versions of the multi-sectors data blocks 614a . . . 614f in the second computing environment 600, in accordance with certain embodiments.

Control starts at block 706, where the storage controller 602 reads a plurality of multi-sector data blocks 614a . . . 614f via the associated device adapters 606a . . . 606c. The generation counts associated with the multi-sector data blocks 614a . . . 614f are also read by the storage controller 602 while reading the multi-sector data blocks 614a . . . 614f.

The storage controller 602 compares (at block 708) the generation counts of each multi-sector data block 614a . . . 614f to determine the multi-sector data block with the latest, i.e., most recent, version of the data. In certain embodiments, the multi-sector data block with the highest generation number may have the latest version of the data.

Therefore, FIGS. 6, 7a and 7b illustrate certain embodiments in which a plurality of versions of a multi-sector data block are kept for data redundancy, backups, etc. In addition to determining data integrity as described in FIGS. 1, 2, 3a, 3b, 4, 5a, 5b, the operations described in FIGS. 7a, 7b may also determine the latest version of the multi-sector data blocks stored in the storage devices 604.

In many situations, in which a computational device, such as, a storage controller, writes data to one or more storage devices, the data written may span a plurality of sectors. In such as situation, if there is a power failure or some other error during the process of writing data, then data integrity of the data stored in the one or more storage devices may be lost. Certain embodiments are capable of detecting the validity of data by storing indicators, such as, checkfield indicators and/or generation count indicators in at least one additional sector that does not include the data. In certain additional embodiments, a plurality of version numbers associated with a plurality of data blocks are stored in a plurality of storage devices and the most recent version of the plurality of data blocks is determined by a storage controller.

In certain embodiments, a computation device, such as, a storage controller or a subsystem storage controller issues a write request to a device adapter. The device adapter breaks up the writes into smaller blocks and completes the writing of the smaller blocks in a specified order. In certain embodiments, a data pattern is written to invalidate the large data block on a disk. Then the large data block is written except for a small invalidation pattern to the disk. Subsequently, a valid data pattern is written to the disk over the invalid data pattern to finish writing the data block.

Additional Embodiment Details

The described techniques may be implemented as a method, apparatus or article of manufacture involving software, firmware, micro-code, hardware and/or any combination thereof. The term "article of manufacture" as used herein refers to program instructions, code and/or logic implemented in circuitry (e.g., an integrated circuit chip, Programmable Gate Array (PGA), ASIC, etc.) and/or a computer readable medium (e.g., magnetic storage medium, such as hard disk drive, floppy disk, tape), optical storage (e.g., CD-ROM, DVD-ROM, optical disk, etc.), volatile and non-volatile memory device (e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.). Code in the computer readable medium may be accessed and executed by a machine, such as, a processor. In certain embodiments, the code in which embodiments are made may further be accessible through a transmission medium or from a file server via a network. In such cases, the article of manufacture in which the code is implemented may comprise a transmission medium, such as a network transmission line, wireless transmission media, signals propagating through space, radio waves, infrared signals, etc. Of course, those skilled in the art will recognize that many modifications may be made without departing from the scope of the embodiments, and that the article of manufacture may comprise any information bearing medium known in the art. For example, the article of manufacture comprises a storage medium having stored therein instructions that when executed by a machine results in operations being performed.

Figure 8:
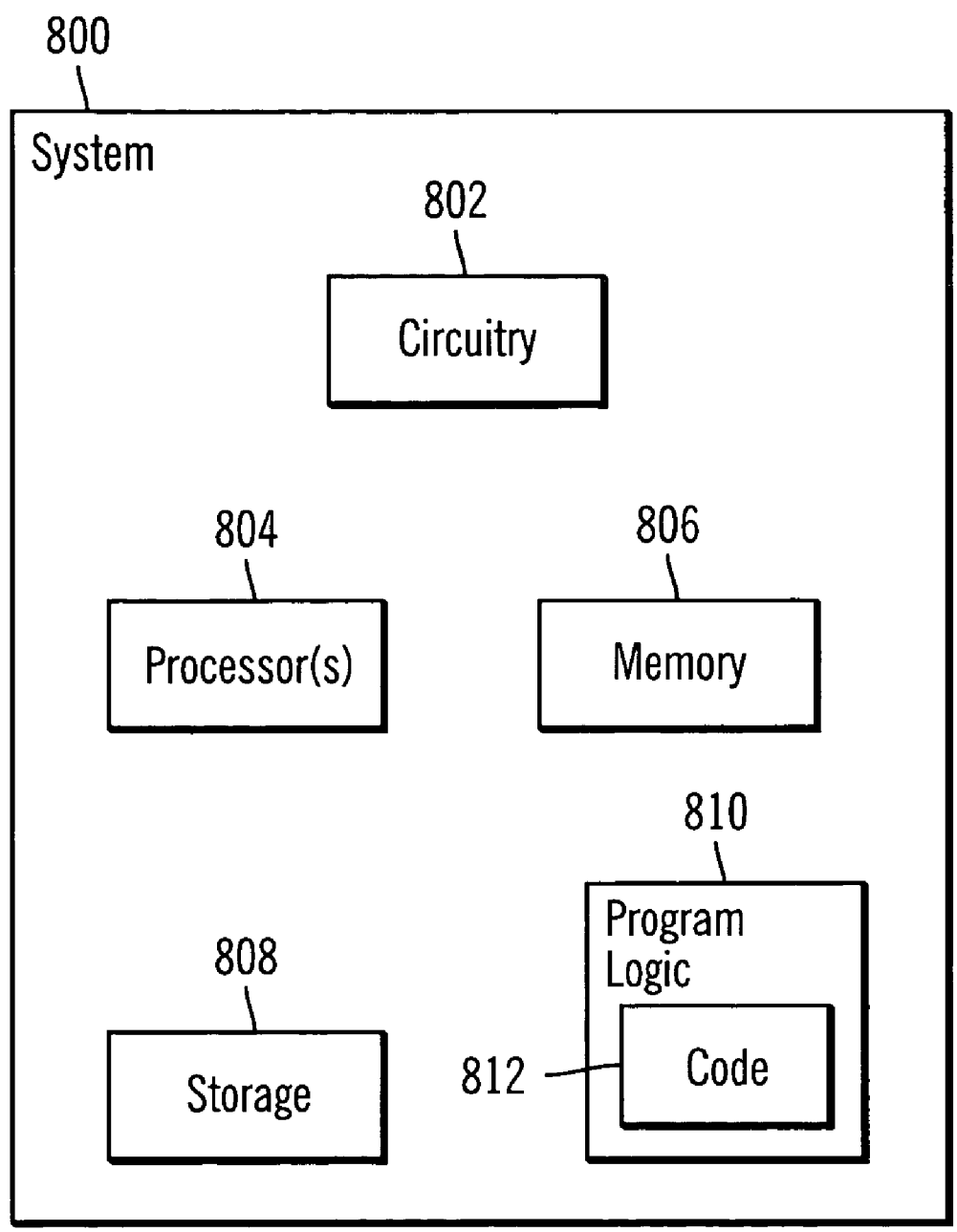
FIG. 8 illustrates a system in which certain embodiments are implemented.

FIG. 8 illustrates a block diagram of a system 800 in which certain embodiments may be implemented. In certain embodiments, the computational device 102 and the storage controller 602 may be implemented in accordance with the system 800. The system 800 may include a circuitry 802 that may in certain embodiments include a processor 804. The system 800 may also include a memory 806 (e.g., a volatile memory device), and storage 808. Certain elements of the system 800 may or may not be found in the computational device 102 and the storage controller 602. The storage 808 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 808 may comprise an internal storage device, an attached storage device and/or a network accessible storage device. The system 800 may include a program logic 810 including code 812 that may be loaded into the memory 806 and executed by the processor 804 or circuitry 802. In certain embodiments, the program logic 810 including code 812 may be stored in the storage 808.

At least certain of the operations of FIGS. 3a, 3b, 5a, 5b, and 7a, 7b may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-8 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:

writing an indicator to invalidate a data block that is capable of being stored in a plurality of sectors of a storage device, wherein the storage device is a disk based storage device, wherein the indicator is written to the storage device in at least one sector that is not included in the plurality of sectors;

initiating a writing of entire contents of the data block to the plurality of sectors of the storage device, in response to the writing of the indicator; and updating the indicator to validate the data block, in response to a completion of the writing of the entire contents of the data block to the plurality of sectors of the storage device, wherein the at least one sector and the plurality of sectors are included in a same storage device, wherein a sector is a unit of data storage, wherein the at least one sector and the plurality of sectors comprise a record, wherein the at least one sector is a first sector of the record, wherein the indicator is a first indicator that is capable of validating the data block if at least one version of the entire contents of the data block has been completely written to the storage device, and wherein the first indicator has been written to the first sector, the method further comprising: (i) writing a second indicator to the first sector, wherein the second indicator indicates a version number of the data block; (ii) reading the first indicator and the second indicator written to the first sector; and (iii) determining that the data block is valid and has the version number indicated in the second indicator, in response to determining that the first indicator has validated the data block, wherein the first sector comprises a record header, wherein the first indicator is a checkfield indicator comprising an error detection code, and wherein the second indicator is a generation count, and wherein the method further comprises:

(a) sending, by a storage controller, a plurality of versions of multi-sector data blocks and associated generation counts via a plurality of device adapters to a plurality of storage devices including a plurality of disk arrays;

(b) reading, by the storage controller, the plurality of versions of the multi-sector data blocks and the associated generation counts via the plurality of device adapters; and (c) comparing, by the storage controller, generation counts of each of the plurality of versions of the multi-sector data blocks to determine one multi-sector data block with a most recent version of the data, wherein the plurality of versions of the multi-sector data blocks are maintained to assure data redundancy, and wherein in response to an interruption of data transfer before all sectors of a multi-sector data block have been written, the multi-sector data block and a last sector will not indicate the same generation count.

2. The method of claim 1, further comprising:
receiving an interruption subsequent to the initiating of the writing of the entire contents of the data block and prior to the updating of the indicator to validate the data block; and
reading the indicator to determine whether the data block is invalid.

3. The method of claim 1, wherein the indicator indicates a version number of the data block, the method further comprising:
writing a new version number of the data block with the entire contents of the data block in the plurality of sectors of the data block, wherein the updating of the indicator to validate the data block further comprises writing the new version number of the data block to the indicator.

4. The method of claim 1, the method further comprising:
reading version numbers corresponding to the data block and the indicator; and determining that the data block is valid if the version numbers corresponding to the data block and the indicator are the same.

5. The method of claim 1, the method further comprising:
reading version numbers corresponding to the data block and the indicator; and
determining that the data block is invalid if the version numbers corresponding to the data block and the indicator are different.

6. The method of claim 1, further comprising:
storing a plurality of versions and associated version numbers of a plurality of data blocks in a plurality of storage devices; and
comparing the version numbers of the plurality of data blocks to determine one data block with most recently updated data.

7. The method of claim 6, wherein the plurality of storage devices are RAID arrays, wherein the writing, the initiating, the updating, the storing, and the comparing are performed by a storage controller that is coupled to the RAID arrays by the plurality of device adapters.

8. The method of claim 1, wherein the writing, the initiating, and the updating are performed by a data integrity controller implemented in a computational device coupled to the storage device.

9. The method of claim 1, wherein the writing, the initiating, and the updating are performed by a data integrity controller implemented in the storage device.

10. The method of claim 1, wherein the entire contents of the data block comprise data corresponding to the data block, wherein the data is generated by a computational device for storing in the storage device, and wherein the plurality of blocks in which the entire contents are stored in the storage does not include the indicator.

11. The method of claim 1, wherein the error detection code corresponds to a cyclic redundancy check of a corresponding multi-sector data block.

12. A system in communication with a storage device, the system comprising:
a memory; and
a processor coupled to the memory, wherein the processor performs operations, the operations comprising:
writing an indicator to invalidate a data block that is capable of being stored in a plurality of sectors of the storage device, wherein the storage device is a disk based storage device, wherein the indicator is written to the storage device in at least one sector that is not included in the plurality of sectors;
initiating a writing of entire contents of the data block to the plurality of sectors of the storage device, in response to the writing of the indicator; and
updating the indicator to validate the data block, in response to a completion of the writing of the entire contents of the data block to the plurality of sectors of the storage device, wherein the at least one sector and the plurality of sectors are included in a same storage device, wherein a sector is a unit of data storage, wherein the at least one sector and the plurality of sectors comprise a record, wherein the at least one sector is a first sector of the record, wherein the indicator is a first indicator that is capable of validating the data block if at least one version of the entire contents of the data block has been completely written to the storage device, and wherein the first indicator has been written to the first sector, the operations further comprising: (i) writing a second indicator to the first sector, wherein the second indicator indicates a version number of the data block;

(ii) reading the first indicator and the second indicator written to the first sector; and (iii) determining that the data block is valid and has the version number indicated in the second indicator, in response to determining that the first indicator has validated the data block, wherein the first sector comprises a record header, wherein the first indicator is a checkfield indicator comprising an error detection code, and wherein the second indicator is a generation count, and wherein the operations further comprise:

(a) sending, by a storage controller, a plurality of versions of multi-sector data blocks and associated generation counts via a plurality of device adapters to a plurality of storage devices including a plurality of disk arrays;

(b) reading, by the storage controller, the plurality of versions of the multi-sector data blocks and the associated generation counts via the plurality of device adapters; and (c) comparing, by the storage controller, generation counts of each of the plurality of versions of the multi-sector data blocks to determine one multi-sector data block with a most recent version of the data, wherein the plurality of versions of the multi-sector data blocks are maintained to assure data redundancy, and wherein in response to an interruption of data transfer before all sectors of a multi-sector data block have been written, the multi-sector data block and a last sector will not indicate the same generation count.

13. The system of claim 12, the operations further comprising:
receiving an interruption subsequent to the initiating of the writing of the entire contents of the data block and prior to the updating of the indicator to validate the data block; and
reading the indicator to determine whether the data block is invalid.

14. The system of claim 12, wherein the indicator indicates a version number of the data block, the operations further comprising:
writing a new version number of the data block with the entire contents of the data block in the plurality of sectors of the data block, wherein the updating of the indicator to validate the data block further comprises writing the new version number of the data block to the indicator.

15. The system of claim 12, the operations further comprising:
reading version numbers corresponding to the data block and the indicator; and
determining that the data block is valid if the version numbers corresponding to the data block and the indicator are the same.

16. The system of claim 12, the operations further comprising:
reading version numbers corresponding to the data block and the indicator; and
determining that the data block is invalid if the version numbers corresponding to the data block and the indicator are different.

17. The system of claim 12, the operations further comprising:
storing a plurality of versions and associated version numbers of a plurality of data blocks in the plurality of storage devices; and
comparing the version numbers of the plurality of data blocks to determine one data block with most recently updated data.

18. The system of claim 17, wherein the plurality of storage devices are RAID arrays, wherein the writing, the initiating, the updating, the storing, and the comparing are performed by the storage controller that is coupled to the RAID arrays by the plurality of device adapters.

19. The system of claim 12, wherein the writing, the initiating, and the updating are performed by a data integrity controller implemented in a computational device coupled to the storage device.

20. The system of claim 12, wherein the writing, the initiating, and the updating are performed by a data integrity controller implemented in the storage device.

21. The system of claim 12, wherein the entire contents of the data block comprise data corresponding to the data block, wherein the data is generated by a computational device for storing in the storage device, and wherein the plurality of blocks in which the entire contents are stored does not include the indicator.

22. The system of claim 12, wherein the error detection code corresponds to a cyclic redundancy check of a corresponding multi-sector data block.

23. A computer readable storage medium, wherein code stored in the computer readable storage medium when executed by a processor causes operations, the operations comprising:
writing an indicator to invalidate a data block that is capable of being stored in a plurality of sectors of a storage device, wherein the storage device is a disk based storage device, wherein the indicator is written to the storage device in at least one sector that is not included in the plurality of sectors;
initiating a writing of entire contents of the data block to the plurality of sectors of the storage device, in response to the writing of the indicator; and
updating the indicator to validate the data block, in response to a completion of the writing of the entire contents of the data block to the plurality of sectors of the storage device, wherein the at least one sector and the plurality of sectors are included in a same storage device, wherein a sector is a unit of data storage, wherein the at least one sector and the plurality of sectors comprise a record, wherein the at least one sector is a first sector of the record, wherein the indicator is a first indicator that is capable of validating the data block if at least one version of the entire contents of the data block has been completely written to the storage device, and wherein the first indicator has been written to the first sector, the operations further comprising: (i) writing a second indicator to the first sector, wherein the second indicator indicates a version number of the data block; (ii) reading the first indicator and the second indicator written to the first sector; and (iii) determining that the data block is valid and has the version number indicated in the second indicator, in response to determining that the first indicator has validated the data block, wherein the first sector comprises a record header, wherein the first indicator is a checkfield indicator comprising an error detection code, and wherein the second indicator is a generation count, and wherein the operations further comprise:

(a) sending, by a storage controller, a plurality of versions of multi-sector data blocks and associated generation counts via a plurality of device adapters to a plurality of storage devices including a plurality of disk arrays;

(b) reading, by the storage controller, the plurality of versions of the multi-sector data blocks and the associated generation counts via the plurality of device adapters; and (c) comparing, by the storage controller, generation counts of each of the plurality of versions of the multi-sector data blocks to determine one multi-sector data block with a most recent version of the data, wherein the plurality of versions of the multi-sector data blocks are maintained to assure data redundancy, and wherein in response to an interruption of data transfer before all sectors of a multi-sector data block have been written, the multi-sector data block and a last sector will not indicate the same generation count.

24. The computer readable storage medium of claim 23, the operations further comprising:

receiving an interruption subsequent to the initiating of the writing of the entire contents of the data block and prior to the updating of the indicator to validate the data block; and reading the indicator to determine whether the data block is invalid.

25. The computer readable storage medium of claim 23, wherein the indicator indicates a version number of the data block, the operations further comprising:

writing a new version number of the data block with the entire contents of the data block in the plurality of sectors of the data block, wherein the updating of the indicator to validate the data block further comprises writing the new version number of the data block to the indicator.

26. The computer readable storage medium of claim 23, the operations further comprising:

reading version numbers corresponding to the data block and the indicator; and determining that the data block is valid if the version numbers corresponding to the data block and the indicator are the same.

27. The computer readable storage medium of claim 23, the operations further comprising:

reading version numbers corresponding to the data block and the indicator; and determining that the data block is invalid if the version numbers corresponding to the data block and the indicator are different.

28. The computer readable storage medium of claim 23, the operations further comprising:

storing a plurality of versions and associated version numbers of a plurality of data blocks in the plurality of storage devices; and comparing the version numbers of the plurality of data blocks to determine one data block with most recently updated data.

29. The computer readable storage medium of claim 28, wherein the plurality of storage devices are RAID arrays, wherein the writing, the initiating, the updating, the storing, and the comparing are performed by the storage controller that is coupled to the RAID arrays by the plurality of device adapters.

30. The computer readable storage medium of claim 23, wherein the writing, the initiating, and the updating are performed by a data integrity controller implemented in a computational device coupled to the storage device.

31. The computer readable storage medium of claim 23, wherein the writing, the initiating, and the updating are performed by a data integrity controller implemented in the storage device.

32. The computer readable storage medium of claim 23, wherein the entire contents of the data block comprise data corresponding to the data block, wherein the data is generated by a computational device for storing in the storage device, and wherein the plurality of blocks in which the entire contents are stored does not include the indicator.

33. The computer readable storage medium of claim 23, wherein the error detection code corresponds to a cyclic redundancy check of a corresponding multi-sector data block.

* * * * *